Oct. 23, 1934.  W. C. MORTENSEN ET AL  1,977,833
AUTOMOBILE LIFT AND PARKING APPARATUS
Filed May 23, 1933  3 Sheets-Sheet 1
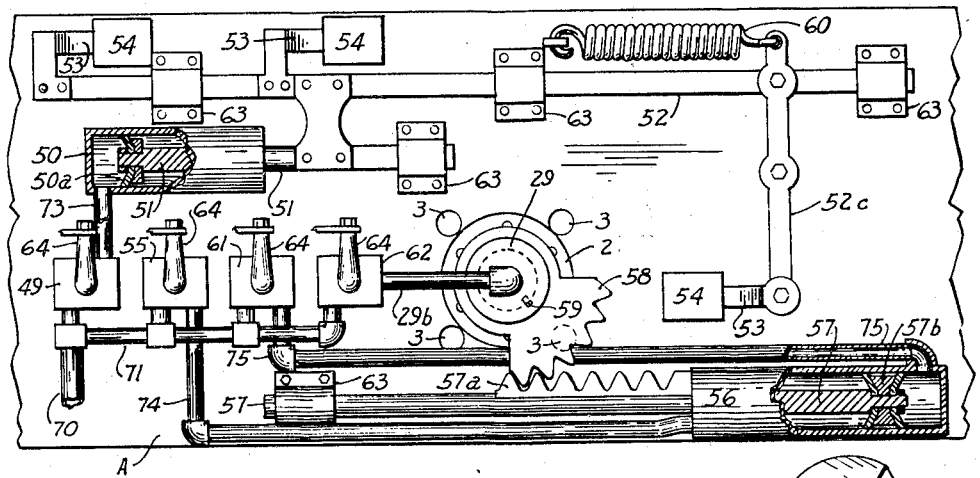
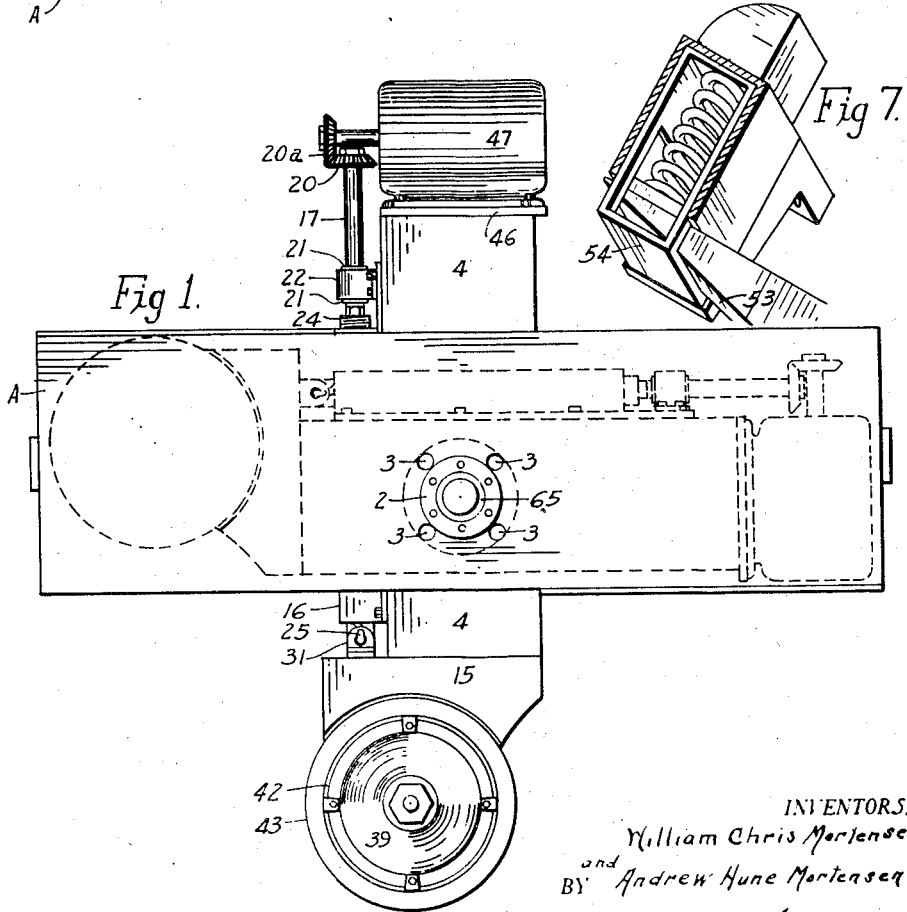
INVENTORS.
William Chris Mortensen
and
BY Andrew Hune Mortensen
ATTORNEY.

Oct. 23, 1934.   W. C. MORTENSEN ET AL   1,977,833
AUTOMOBILE LIFT AND PARKING APPARATUS
Filed May 23, 1933   3 Sheets-Sheet 2
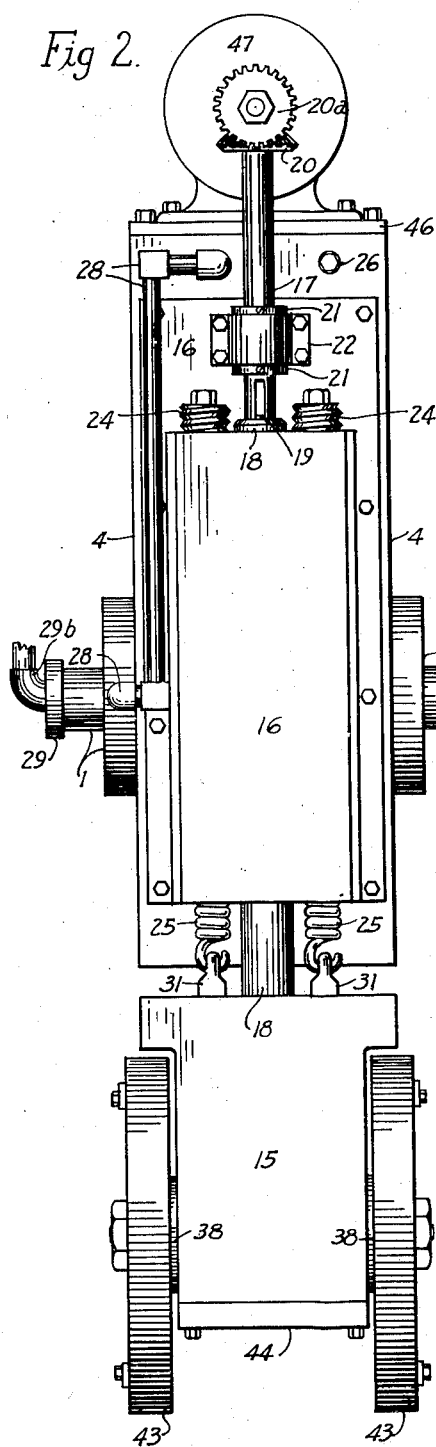
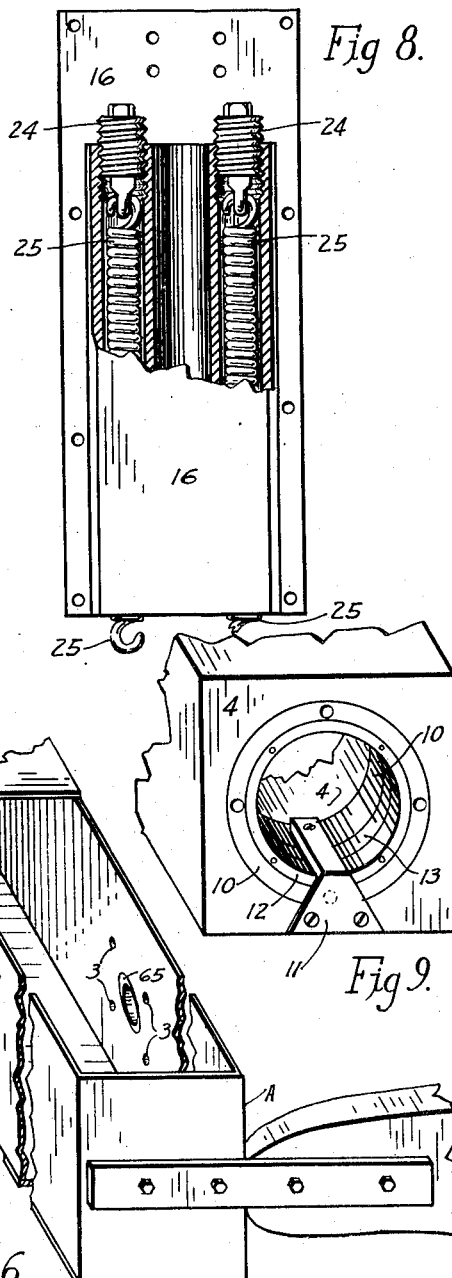
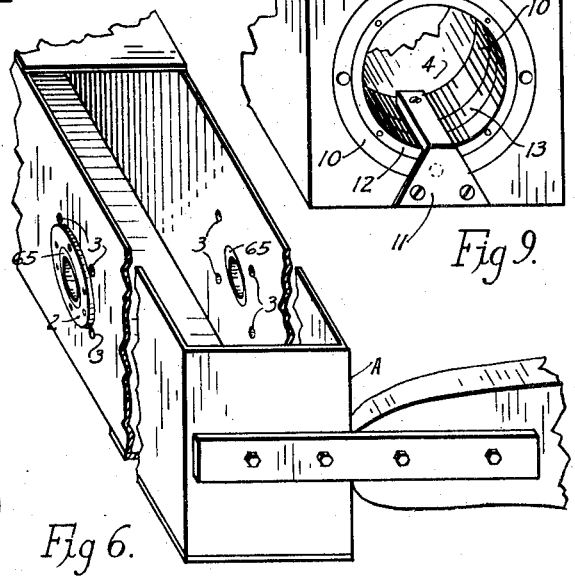
INVENTORS.
William Chris Mortensen
and
BY Andrew Hune Mortensen
R. M. Thomas
ATTORNEY.

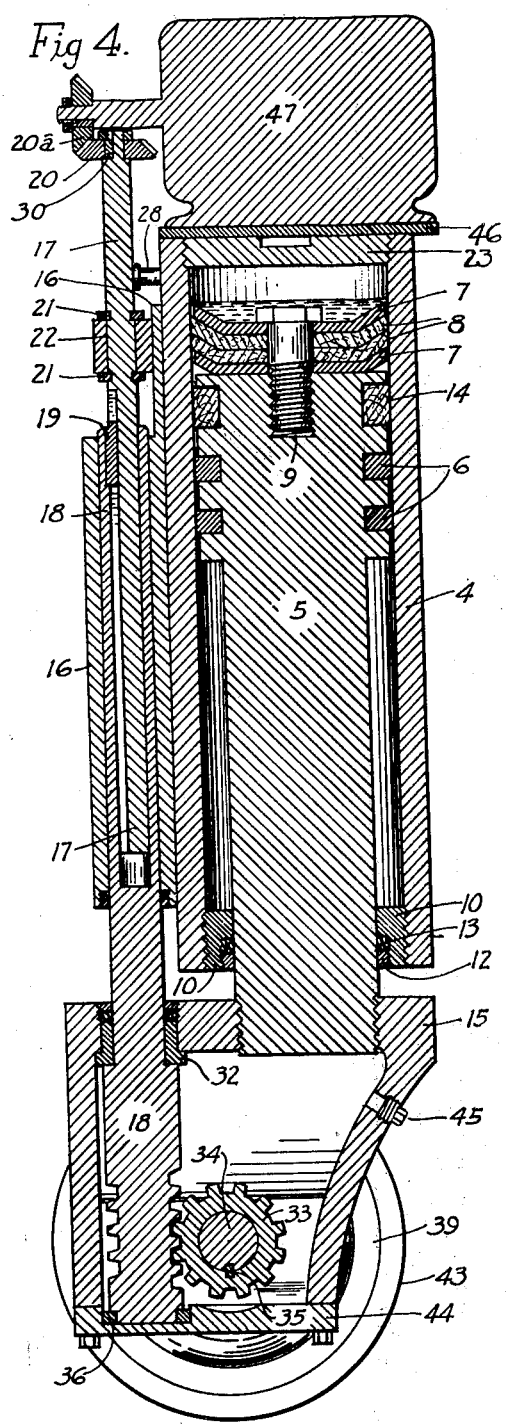
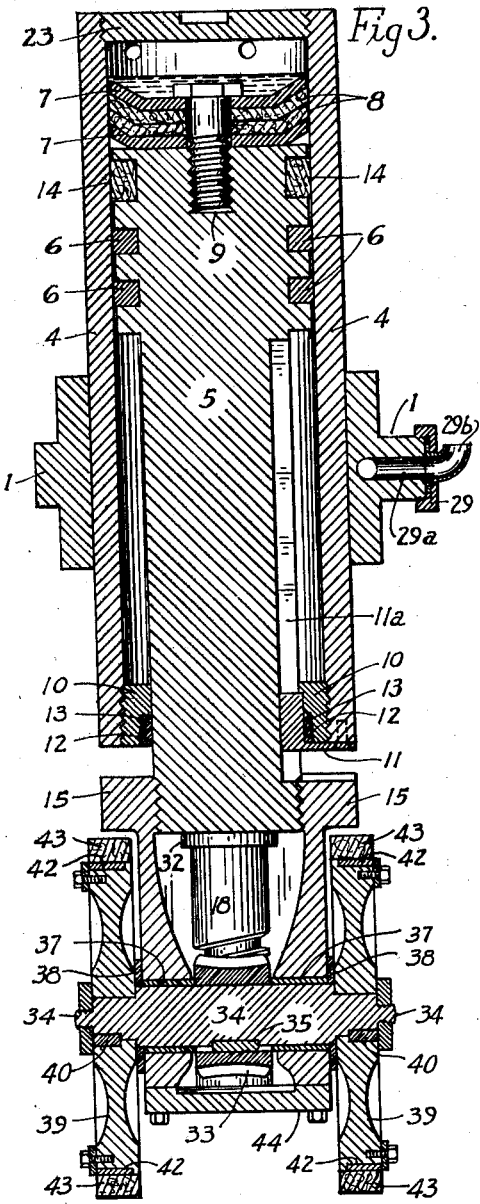

Patented Oct. 23, 1934

1,977,833

UNITED STATES PATENT OFFICE 1,977,833

AUTOMOBILE LIFT AND PARKING APPARATUS

William Chris Mortensen, Los Angeles, Calif., and Andrew Hune Mortensen, Salt Lake City, Utah Application May 23, 1933, Serial No. 672,518

5 Claims. (Cl. 180—1)

Our invention relates to the parking of automobiles parallel to the curb and has for its object to provide a new and efficient lifting and parking apparatus.

The inconvenience of the old method of placing an automobile into a parking space which must be of sufficient length to enable moving the automobile backwardly or forwardly, or for getting out of such a space, or when crowded in such a parking space by other automobiles or other objects, or when in a crowded position and desiring to turn partly or completely around, and moving backwardly and forwardly, causes additional wear on the tires and steering device and loss of time.

And also the old methods of raising the wheels up to mount tires or make other repairs, is an inconvenience as well as a loss of time.

The object and nature of our invention is to lift the end of an automobile up off the surface that is supporting it, and then to move the end of the automobile to the right or to the left for the purpose of getting the automobile into or out of a space insufficient for parking by previous methods.

The further object of our invention is to turn an automobile in a complete circle to the left or to the right within the space of its length, and if several of these inventions are attached to an automobile the entire automobile can be lifted up and moved sidewise for parking into or out from a space not accessible by present methods.

The further object of our invention is to lift an automobile up off the surface supporting it for mounting and repairing tires and other repairs.

These objects we accomplish with the device illustrated in the accompanying drawings in which similar numerals and letters of reference indicate like parts throughout the several views and as described in the specification forming a part of this application and pointed out in the appended claims.

In the drawings in which we have shown the device,

Figure 1 is a face view of the carrying case with the lifting element partially rotated to the vertical position ready for raising the automobile.

Figure 2 is a side elevation of the lifting element, removed from the carrier case.

Figure 3 is a vertical section diametrically through Figure 2.

Figure 4 is a vertical section of the elevating portion of the device taken at right angles to the view shown in Figure 3, parts shown in elevation.

Figure 5 is a view of the control device and means for rotating the elevating device to the vertical position. This portion is mounted on the back side of the carrier case.

Figure 6 is a perspective view of the carrier case, mounted to the vehicle frame.

Figure 7 is the type of lock used to lock the elevating element in either the vertical or horizontal position.

Figure 8 is a face view of the plate on one side of the elevating element, parts cut away to show the springs for returning the piston and motive power wheels to the elevated position.

Figure 9 is a perspective view of the bottom of the elevating cylinder.

The elevating element of the device consists of a square cylinder case 4 having a longitudinal bore therethrough to form the power cylinder for elevating the automobile. Within this case 4 we provide a piston 5, having the head thereof of sufficient length to substantially support the vertical shaft which shaft extends through and below the casing 4, and having the shaft of smaller diameter than the piston and either made integral with or screwed to the piston 5. Compression rings 6 and a hydraulic packing 14 are provided around the perimeter in suitable grooves at the head of the piston. Metal washers 7 secure leather washers 8 to the head of the piston by passing a cap screw 9 medially through the washers into the head of the piston. The top end of the cylinder 4 is closed by a plug or plate 23 being screwed thereinto and the lower end is internally threaded to receive a bushing 10. A key 11 is secured onto the lower end of the case 4, extending out into the bore thereof and is adapted to operate within a suitable key way 11a which will be cut in the shaft of the piston 5 to prevent any rotative action of the piston within the cylinder and to keep the wheels 39 in alignment at all times.

The bushing 10 carries a wiping washer 13 and a retainer ring 12, and is the supporting means for the shaft which extends from the piston 5, and onto the bottom end of the piston shaft we secure a base casting 15. Onto one side of the case 4, we then secure a plate 16, said plate having three holes bored longitudinally therethrough in alignment with the axis of the bore of the cylinder in the case 4. A vertical extension or telescoping drive shaft 18 is passed down through the central hole in the plate 16 and is mounted for rotation in bushings 32 and 36 in the casting 15. The top end of the drive shaft 18 is formed hollow or cylindrical to receive a drive shaft 17. The drive shaft 17 extends down through the bore in the drive shaft 18 to allow for extension of the shaft 18 and the two shafts are keyed together by a key 19 on the end of the shaft 18 operating in a key way cut in the shaft 17. The top end of the shaft 17 is provided with a bearing 22, with rings 21 above and below the bearing 22. The said rings 21 are formed integral with or secured onto the shaft 17 to prevent end motion thereof.

The top of the shaft 17 carries a bevel gear 20 secured thereon by a key 30, the gear meshing with the drive gear 20a of the drive motor 47, which motor is secured onto a plate 46 which in turn is attached to the end of the case 4. The extreme lower end of shaft 18 is either cut into a worm or carries a worm gear thereon. As shown in the drawings the worm is cut directly in the end of the shaft. This worm meshes with the worm wheel 33 mounted on a shaft 34 and keyed thereto by a key 35. Bearings 37 are mounted in the casting 15 and support the shaft 34 with the extreme ends of the shaft extending through each side of the casting 15 to carry wheels 39. The wheels 39 are secured onto the ends of the shaft 34 by keys 40 and suitable nuts with grease retainer 38 carried between the wheels 39 and the casting 15.

Rubber tires 43 are pressed onto rims 42 which rims are held onto the perimeter of the wheels 39 by lugs and cap screws as shown in Figures 3 and 4.

The casting 15 has the bottom end closed by plate 44. This plate carries the bushing or bearing 36 on the end of the shaft 18 below the worm which is formed therein. A grease fitting 45 is provided in the casting 15 to fill the entire casting with oil, lubricating the worm wheel and gear and the bushings on the shaft 18 and the bearings 37 on the shaft 34.

Each side of the case 4 is provided with stub shafts 1, by which the case is partially rotatably mounted in a transversely supported casing A. The casing A may be supported at any desired point along the chassis of the automobile; either at or between the two front or rear ends of the frame or between or to the two rear springs or at any other convenient intermediate point or position thereon.

Two springs 25 are supported by plugs 24 carried in the upper ends of the outside holes in the plate 16 and the lower ends of the springs 25 are attached to the casting 15 by eye bolts 31. A suitable metal cover plate may be mounted on one side of the casing 4, adjacent the plate 16 to close the top side of the casing A when the casing 4 is in the horizontal position. A threaded plug 26 is screwed into metal case 4, through which oil may be inserted into the cylinder above the piston.

One of the shafts 1 has a bore 29a therein which is connected with the interior bore of the cylinder 4 by the pipe 28 to provide means for filling the cylinder with air when operating the piston. A cap 29 is screwed onto the shaft and has a pipe 29b secured thereto. The pipe 29b may be made flexible, or suitable fittings may be provided to connect the pipe 29b with the bore 29a of the stub shaft 1. A quadrant or segment gear 58 is attached to the shaft 1 by the key 59 and a rack 57a is formed on shaft 57 with the rack meshing with the teeth of the segment gear 58. The end of the shaft 57 is carried in the cylinder 56 and carries a piston 57b on the extreme end thereof adapted to be moved longitudinally in said cylinder 56 in either direction as desired. This is a means for operating the segment gear 58 and rotating the case 4 to either the vertical or horizontal position. The free end of the shaft 57 is carried in the guide bearing 63.

This operating mechanism and the locks for locking the case 4 in either the vertical or horizontal positions is secured on to the back side of the carrier case A and the control valves for operating the device are either mounted adjacent thereto, as shown in Fig. 5 of the drawings or when necessary, the control valves may be mounted within easy manual reach of the operator of the automobile with the air pipes or air lines connecting the valves with the operating mechanism on the case. A cylinder 50 is mounted on the back side of the case carrying a piston 50a to which a shaft 51 is secured, the movement of the piston to control the shaft 51. The extreme end of the shaft is supported by a bearing 63 and a link bar connects the shaft 51 with a parallel shaft 52, which is also supported by suitable bearings 63 and which shaft is spaced from the shaft 51.

Forcing keys 53 are secured onto the shaft 52 to operate the locks 54. The locks 54 are mounted onto the carrier case A and so positioned that two of said locks will lock the case 4 into the vertical position and one of said locks will lock the case 4 into the horizontal position. This provides means for holding the operating cylinder in a rigid vertical position when in use or in a rigid horizontal position when not being used.

The extreme end of the shaft 52 is attached to a lever 52c, which lever is pivoted medially thereof and which has a spring 60 attached to one end to normally hold forcing keys 53 free from the locks 54. The extreme end of the lever 52c carries a key 53 for actuating one of the locks 54, which locks the lifting case 4 in a vertical position. As shown in the drawings a supply pipe 70 provides a source of fluid pressure, which pressure may be developed either by a compressor, run from the automobile engine, or from a storage tank which may be filled from any suitable source, such as a service station, or which pressure may be hydraulic if desired. This pipe 70 is connected with a distributing pipe 71, which distributes fluid pressure to either of the valves 49, 55, 61 or 62 at all times. The valve 49 is connected with the cylinder 50 by a pipe 73. The valve 55 is connected with one end of the cylinder 56 by a pipe 74. The opposite end of the cylinder 56 is connected with a valve 61 by a pipe 75 and the valve 62 is attached to the pipe 29b and is the valve which controls the raising or lowering of the piston 5 in the cylinder 4. Control levers 64 are provided to actuate the valves 49, 55, 61 or 62. When these valves are mounted onto or adjacent to the carrier case, the levers 64 must be controlled by suitable linkage such as cables, wires or mechanical leverages with the driving compartment of the automobile as before stated. These valves may be mounted in the driving compartment and the pipes 73, 74, 75 and 29b may be made of sufficient length to reach from the driving compartment to that position at which the carrier case is mounted.

Suitable switches and wires will be provided to control the motor 47 so that the driver of the automobile may control the motor 47 driving the wheels 39 in either direction necessary to park or move away from the curb after parking. The motor may be operated from the battery or other such source of energy.

Onto the outside of the carrier case A concentric with the holes through which the stub shafts 1 are carried, the bushings 65 are secured to the case A by flanges 2 formed thereon.

The stub shafts 1 secured to the case 4, are provided with flanges therearound to secure them to the case by suitable stud bolts or other similar means and holes 3 are provided through the sides of the case A around the bore through which the stub shafts are passed to provide means for mounting or dismounting the case 4 within the carrier case A.

The operation of the device is as follows:

To raise the vehicle the operator first releases the locks 54 by allowing air to enter the cylinder 50 through the valve 49 thereby pressing the keys 53 into the locks releasing the case 4. The operator then opens the valve 61 to allow air to enter the end of the cylinder 56 which actuates the piston therein and moves the shaft 57, thereby partially rotating the segment gear 58, raising the case 4 to the vertical position. At this position the valve 49 is released and the locks 54 will hold the device in the vertical position. The operator then opens the valve 62 which allows air to pass into the case 4 through the pipes 29b and forces the piston 5 down in the cylinder of the case 4 until the wheels 39 engage the surface under the automobile. The motor 47 is then actuated to move the end of the car on which the device is mounted toward or away from the curb or to turn the car entirely around. The motor 47 rotates the gear 20, the shafts 17 and 18, and the worm 33 which in turn rotates the shaft 34 and turns the wheels in the desired direction. In lowering the vehicle, the operator first releases the air pressure in the case 4 by closing the valve 62. The springs 25 will then raise the lower case 15 up into the case 4. The operator then opens the locks 54 by allowing air to enter the cylinder 50 through the valve 49 thereby pressing the keys 53 into the locks releasing the case 4. The operator then opens the valve 55 to allow air to enter the opposite end of the cylinder 56 through the pipe 74 which then actuates the piston shaft 57, partially rotating the segment gear 58, placing the device in the horizontal position in the case A at which position the locks 54 are released by closing the valve 49 the locks will hold the device in a rigid horizontal position in the case A.

From the foregoing description, it will be apparent that our invention is applicable to various situations, and that the mechanism required in carrying out our invention may be comparatively simple and inexpensive and may be designed and constructed so that it is convenient to apply to an ordinary automobile. Further, the form, arrangement and details of the mechanism may be varied and still be within the broader aspects of our invention. In view of the nature of our invention, we wish it considered broadly, and we do not limit ourselves to the particular details herein above set out, but wish to reserve to ourselves any changes or variations that may appear to those skilled in the art within the scope of the following claims.

Having thus described our invention, we desire to secure by Letters Patent and claim:

1. In a device of the class described, the combination of a carrier case mounted transversely of an automobile chassis; a cylinder carried pivotally in said case; a piston in said cylinder; a casting secured to the bottom of said piston carrying a transverse shaft therein; a set of sliding shafts connected to a worm wheel to drive said shaft; wheels on said shaft; an electric motor to drive said shafts and said wheels and means to allow fluid pressure to enter the top of said cylinder to raise the automobile chassis.

2. In a device of the class described, the combination of a transverse carrier case mounted to an automobile chassis; a cylinder mounted pivotally within said case; a piston carried in said cylinder having wheels mounted onto the lower end of the shaft connected with the piston; a sliding drive connecting an electric motor with said wheels to rotate the wheels in either direction desired; means to pivot said cylinder to the vertical position; means to introduce fluid pressure into said cylinder above said piston to raise the automobile; means to drive said electric motor in either direction desired to rotate the wheels on the end of the case in either direction; and means to lock the cylinder in either the horizontal position in the case, or in the vertical position for use in raising or lowering the automobile.

3. In a device of the class described, the combination of a carrier case mounted to an automobile chassis; a cylinder pivotally mounted therein; a piston in said cylinder; wheels mounted onto the bottom of said piston; a motor mounted onto said cylinder and connected with said wheels by interlocking shafts and gears to rotate the wheels in either direction; means by rack and gear to lower the cylinder to the vertical position or tilt the cylinder to the horizontal position; and means to introduce pressure into said cylinder above said piston to raise the automobile as desired with spring means to raise the wheels from the ground when no pressure is above said piston.

4. In a device of the class described, the combination of a cylinder mounted to an automobile chassis; a piston operable longitudinally therein; a casting secured onto the bottom end of the piston where it extends below the cylinder; a worm and wheel carried in said casting; a shaft on which the worm wheel is mounted; wheels on each extended end of said shaft; a motor mounted on said case; an extension shaft mounted to said worm with the top end driven by said motor; means to introduce air into said cylinder to drive the piston down to raise the automobile; and means to control the motor to rotate the wheels in either direction.

5. In a device of the class described, the combination of a cylinder mounted onto an automobile chassis; a long piston operable in said cylinder with the end extending from one end thereof; a cross shaft mounted onto the end of said piston; a worm wheel on said shaft; a worm formed in the bottom end of a vertical shaft with the worm and worm wheel meshing; another shaft mounted vertically within the first shaft; means to rotate the top shaft and transmit such rotation to the lower shaft, the worm wheel, and the cross shaft; wheels mounted onto the extended ends of said cross shaft to support the entire device when the piston is lowered in the cylinder; means to introduce air into the cylinder to force the piston down and lower the wheels and assembly and spring means to raise the wheels and assembly when the air is released from the cylinder.

WILLIAM CHRIS MORTENSEN.
ANDREW HUNE MORTENSEN.